United States Patent Office 3,152,131
Patented Oct. 6, 1964

3,152,131
CATALYST FOR PREPARING CARBODIIMIDES
Jack W. Heberling, Jr., Wilmington, Del., assignor to E. I. du Pont de Nemours and Company, Wilmington, Del., a corporation of Delaware
No Drawing. Filed Nov. 28, 1961, Ser. No. 155,500
6 Claims. (Cl. 260—288)

This invention relates to a novel process for the preparation of carbodiimides. More particularly this invention relates to a novel catalytic process of preparing carbodiimides from isocyanates.

Carbodiimides are compounds containing the group —N=C=N—. They have a variety of uses, e.g. they are useful as catalysts for converting alcohols and acids to esters, for converting acids and amines to amides such as polypeptides and as intermediates for preparing isourea ethers, guanidines, ureas and the like. Polycarbodiimides, prepared from polyisocyanates, are also useful for preparing films, fibers and the like.

The older methods for preparing carbodiimides are rather laborious and of limited applicability. A well-known method involves reacting thioureas with mercuric oxide or the like to form the carbodiimide, mercuric sulfide and water, i.e.

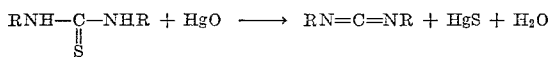

Another method involves the reaction of organic isocyanates with phosphine-imines to form carbodiimides, i.e.

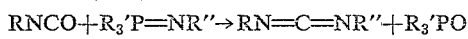

Unfortunately, the phosphine-imines are somewhat laborious to prepare. A more convenient method involves conversion of isocyanates to carbodiimides in the presence of certain phospholines or phospholine oxides, e.g.

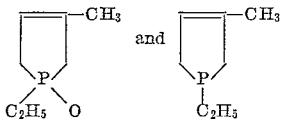

This method gives carbodiimides in excellent yields but has the disadvantage that the catalysts are rather difficult to prepare in commercial practice.

It is an object of this invention to provide a new process for the production of carbodiimides. A further object is to provide new catalysts for carbodiimide production. A still further object is to provide catalysts useful with all types of isocyanates for carbodiimide production. Other objects will appear hereinafter.

These and other objects of this invention are accomplished by the process of preparing organic carbodiimides which comprises heating an organic isocyanate and a catalyst, which is a metallic derivative of acetylacetone, together in the range of from about 100° C. to about 250° C. The catalytic reaction evolves carbon dioxide which can be used as a guide to regulate the reaction. Optionally an organic solvent can be used for the reaction as long as the solvent is free of Zerewitinoff active hydrogen.

In carrying out the process of the present invention, any organic isocyanate, including monoisocyanates and polyisocyanates, may be used, such as aromatic, aliphatic or cycloaliphatic types. These organic isocyanates may contain other substituents; however, it is readily apparent that these substituents should not be reactive with the isocyanate group or groups. Therefore, they should not be of the active hydrogen-containing type which display activity according to the Zerewitinoff test. The isocyanates can contain from one to three isocyanate groups.

The catalyst of said catalytic reaction is chosen from the nonionic acetylacetone derivatives of metals of groups IIA, IIIB, IVB of atomic numbers 40 to 72, VB, VIB, VIIB of atomic number 25, VIII, IB of atomic number 29, IIIA of atomic numbers 13 to 81, the lanthanide series of atomic numbers 58 to 71 and the actinide series of atomic numbers 89, 90 and 92. (The periodic table that was used in determining the above group is found in Handbook of Chemistry, Lange, 9th ed., 1956, pages 56–57.)

The preferred catalysts are the derivatives of beryllium, aluminum, zirconium, chromium and iron. These have the formulae Be(ac)$_2$, Al(ac)$_3$, Zr(ac)$_4$, Cr(ac)$_3$ and Fe(ac)$_3$ where "ac" represents the acetylacetone radical in its enolized form, i.e. CH$_3$COCH=C(CH$_3$)O—. Of this group, the iron derivative is most preferred. Other nonionic acetylacetone derivatives which are useful in the present process include Mo(ac)$_2$, U(ac)$_3$, Mn(ac)$_3$, Co(ac)$_2$, Ni(ac)$_2$, Pt(ac)$_2$, In(ac)$_3$, Ce(ac)$_2$, Cu(ac)$_2$, Mg(ac)$_2$, Ca(ac)$_2$, Sr(ac)$_2$, Ba(ac)$_2$, Tl(ac), Sc(ac)$_3$, La(ac)$_3$, Pr(ac)$_3$, Sm(ac)$_3$, V(ac)$_3$, VO(ac)$_2$, Co(ac)$_3$, Ga(ac)$_3$, Th(ac)$_4$, Hf(ac)$_4$, Ce(ac)$_4$, MoO$_2$(ac)$_2$, UO$_2$(ac)$_2$ and Y(ac)$_3$. These compounds are all well described in Handbuch der, Organische Chemie, Beilstein, ed. 4, vol. 1, p. 782ff and the three supplements thereto, as well as Ephraim's "Inorganic Chemistry," Nordman, 1943, p. 343ff. These derivatives are prepared by reacting the metal halide, e.g. FeCl$_3$, with acetylactone in a nonaqueous solvent. The products are highly colored solids, generally soluble in many organic solvents but insoluble in water.

It should be noted that there are a number of acetylacetone derivatives which are not useful in this process because they are ionic in nature. Those that are particularly well known are the derivatives of boron, titanium and silicon.

The catalyst concentration is not critical but does have an effect on the rate of the reaction of the present process. It is unlikely that a catalyst concentration below 0.1 mole percent would be of interest. Higher catalyst concentrations are useful with some of the less efficient catalysts. There is no need for any of the catalyst concentrations to exceed 10 mole percent of the isocyanate however.

The present invention is carried out by mixing the isocyanate, the catalyst and, optionally, the organic solvent free from Zerewitinoff active hydrogen under anhydrous conditions in a suitable reaction vessel and heating the mixture at from 100° C. to about 250° C. until the evolution of carbon dioxide ceases, in the case of monoisocyanates, or until a predetermined amount of carbon dioxide is released in the case of polyisocyanates. Although temperatures as low as 100° C. can be used, it is generally preferable to use temperatures in excess of 140° C. to reduce by-product formation. The solvent, if used, should have a boiling point at least as high as the desired reaction temperature. At lower temperatures, toluene can be used; at higher temperatures the xylenes or orthodichlorobenzene are suitable. The presence of a solvent makes isolation of the product somewhat simpler since fewer side reactions leading to tar formation occur and the product can be removed from the reaction vessel as a solution after cooling. Most of the carbodiimides are solids (the diphenyl and di-o-tolyl compounds are two exceptions) which requires removing them from the reaction vessel while hot if no solvent is used.

The catalysts of this invention are useful for converting isocyanates to carbodiimides only in the temperature range indicated. At lower temperatures, say room temperature, most of these same catalysts cause isocyanates to trimerize to the 2,4,6-triketohexahydro-1,3,5-triazines. Also, at lower temperatures, these catalysts have a tendency to convert any carbodiimide formed to dimers (2,4-diimino-1,3-diazetidines) and trimers (2,4,6-triiminohexahydro-1,3,5-triazines). The dimerization and trimerization appear to be reversible and are effectively prevented by operating at higher temperatures. It is necessary, however, to find by tests which temperature is most effective with any particular catalyst and isocyanate. It is, of course, understood that a particular set of reaction conditions will be preferred for each combination of catalyst and isocyanate and that it is impossible to delineate all such information here.

It is indicated above that the solvent, if used, and catalysts must be free of Zerewitinoff active hydrogen. A compound which contains Zerewitinoff active hydrogen reacts with methyl magnesium halide (methyl Grignard reagent) to form methane. This is the basis of the well-known Zerewitinoff test which is more fully described in "Quantitative Organic Analysis" by Niederl and Niederl (Wiley, New York, 2nd ed., p. 263ff). It is well known that organic isocyanates containing Zerewitinoff hydrogen cannot be prepared for they would react among themselves. Thus isocyanates containing free hydroxyl, carboxyl, mercapto, amino (containing NH), sulfonic acid, amide (containing NH), sulfonamido (containing NH) and most aliphatic nitro groups are unavailable in theory and therefore cannot be used in this invention. The aromatic isocyanates which are useful in this invention are, in general, derivatives of benzene, naphthalene, anthracene, phenanthrene, pyridine, quinoline and the like. Derivatives of benzene and naphthalene are preferred because they are more readily available. These aromatic isocyanate molecules may contain substituents such as halogen, alkoxyl groups, carboalkoxy groups, nitrile groups, nitro groups, alkyl groups and the like which are unreactive toward isocyanate groups. The aliphatic isocyanates which are useful in this invention are any of those obtained from aliphatic amines which are free from groups which react with isocyanate groups. In general, they may contain alkoxyl groups, carboalkoxy groups, nitrile groups, dialkylamino groups and the like. In general, halogenated aliphatic isocyanates are not readilly available although some are known and may be used. Of course, these restrictions apply to both acyclic and cyclic aliphatic isocyanates.

Some useful examples of isocyanates are: phenyl isocyanate, o-phenyl diisocyanate, m-phenyl diisocyanate, p-phenyl diisocyanate, 1,3,5-phenyl triisocyanate, o-tolyl isocyanate, m-tolyl isocyanate, p-tolyl isocyanate, other similar alkylphenyl isocyanates containing ethyl, propyl groups etc., o-methoxyphenyl isocyanate, m-methoxyphenyl isocyanate, p-methoxyphenyl isocyanate, similar alkoxyphenyl isocyanates containing ethyl, propyl and like groups, o-chlorophenyl isocyanate, m-chlorophenyl isocyanate, p-chlorophenyl isocyanate, the corresponding bromine derivatives, o-nitrophenyl isocyanate, m-nitrophenyl isocyanate, p-nitrophenyl isocyanate, haloalkylphenyl isocyanates such as 3-chloro-2-methylphenyl isocyanate and similar isomeric compounds, alkylnitrophenyl isocyanates such as 4-methyl-3-nitrophenyl isocyanate and similar compounds, alkylphenyl polyisocyanates such as 2,4-toluene diisocyanate, 2,6-toluene diisocyanate and 2,4,6-toluene triisocyanate, other phenyl polyisocyanates such as 1-nitrophenyl-3,5-diisocyanate, diphenyl ether derivatives such as p-phenoxyphenyl isocyanate, 4,4'-diisocyanatodiphenyl ether and 3,3'-dichloro-4,4'-diisocyanatodiphenyl ether, diphenylmethane derivatives such as 4,4'-diisocyanatodiphenylmethane and 3,3'-dichloro-4,4' - diisocyanatodiphenylmethane, o-phenylphenylisocyanate, m-phenylphenyl isocyanate and p-phenylphenyl isocyanate, 1-naphthyl isocyanate, 4,4'-diphenyl diisocyanate, 2-naphthyl isocyanate, 1,2,3,4-tetrahydro-2-naphthyl isocyanate, 7-methyl-1-naphthyl isocyanate, 2-methyl-1-naphthyl isocyanate, 4-methyl-1-naphthyl isocyanate, 2-chloro-1-naphthyl isocyanate, 4-chloro-1-naphthyl isocyanate, 7-chloro-1-naphthyl isocyanate, 8-chloro-1-naphthyl isocyanate, 4-chloro-2-methyl-1-naphthyl isocyanate, 2,4-dichloro-1-naphthyl isocyanate, 4,7-dichloro-1-naphthyl isocyanate, 5,7-dichloro-1-naphthyl isocyanate, 5,8-dichloro-1-naphthyl isocyanate, the bromo derivatives corresponding to the above chlorocompounds, 2-nitro-1-naphthyl isocyanate, 4-nitro-1-naphthyl isocyanate, 5-nitro-1-naphthyl isocyanate, 8-nitro-1-naphthyl isocyanate, 4-chloro-2-nitro-1-naphthyl isocyanate, 2,4-dinitro-1-naphthyl isocyanate, 4,5-dinitro-1-naphthyl isocyanate, 4,8-dinitro-1-naphthyl isocyanate, 1-chloro-2-naphthyl isocyanate, 5,8-dichloro-2-naphthyl isocyanate, 1,3,4-trichloro-2-naphthyl isocyanate, 1,6-dichloro-2-naphthyl isocyanate, 1-nitro-2-naphthyl isocyanate, 5-nitro-2-naphthyl isocyanate, 6-bromo-1-nitro-2-naphthyl isocyanate, 1,5-dinitro-2-naphthyl isocyanate, 1,6-dinitro-2-naphthyl isocyanate, 1,8 - dinitro-2-naphthyl isocyanate, 1-methyl-2-naphthyl isocyanate, 1,4-dimethyl-2-naphthyl isocyanate, 1-anthracene isocyanate, 2-anthracene isocyanate, 9-anthracene isocyanate, 2-phenanthrene isocyanate, 4-phenanthrene isocyanate, 9-phenanthrene isocyanate, 1,2-naphthalene diisocyanate, 4-chloro-1,2-naphthalene diisocyanate, 4-methyl-1,2-naphthalene diisocyanate, 1,3-naphthalene diisocyanate, 1,4-naphthalene diisocyanate, 1,5-naphthalene diisocyanate, 1,6-naphthalene diisocyanate, 1,7-naphthalene diisocyanate, 1,8-naphthalene diisocyanate, 4-chloro-1,8-naphthalene diisocyanate, 2,3-naphthalene diisocyanate, 2,7-naphthalene diisocyanate, 1,8-dinitro-2,7-naphthalene diisocyanate, 1-methyl-2,4-naphthalene diisocyanate, 1-methyl-5,7-naphthalene diisocyanate, 6-methyl-1,3-naphthalene diisocyanate, 7-methyl-1,3-naphthalene diisocyanate, ethyl isocyanate, propyl isocyanate, butyl isocyanate, hexyl isocyanate, cyclopentyl isocyanate, 1,6-hexane diisocyanate, undecyl isocyanate, octadecyl isocyanate, cyclohexyl isocyanate, 1,10-decane diisocyanate, carboethoxymethyl isocyanate, 1,3-cyclohexane diisocyanate, 1,4-cyclohexane diisocyanate, allyl isocyanate, 3-chloro-1-propyl isocyanate, p-ethoxyphenyl isocyanate, 1,8-octane diisocyanate, 2-pyridine isocyanate, 2-quinoline isocyanate and 1,12-dodecane diisocyanate.

The monoisocyanate above give monocarbodiimides while the polyisocyanates give polycarbodiimides (molecules containing more than one carbodiimide group, not polymers formed by polymerization of the carbodiimide group itself). The latter can be allowed to polymerize to completion or, if desired, the molecular weight of the polymer can be controlled by adding an alcohol after a pre-determined amount of carbon dioxide has evolved to stop the growing polymer chains (see Smeltz, U.S. 2,941,983).

The following examples illustrate the invention with respect to operating conditions, types of catalysts and types of useful isocyanates. It is, of course, understood that these examples are meant to illustrate and not limit the invention. Parts are by weight unless otherwise indicated.

*Example 1*

A mixture of 4.27 moles of o-tolylisocyanate, 0.0129 mole of zirconium acetylacetonate, and 8.9 moles of the solvent ortho-dichlorobenzene is placed in a dry reaction vessel equipped with an agitator, a dry nitrogen sweep, a reflux condenser and a weighing bulb filled with a form of sodium hydroxide absorbed on asbestos for determining the carbon dioxide conversion. The mixture is heated at 180° C. for six hours with the evolution of carbon dioxide. Di-o-tolylcarbodiimide is obtained and identified by infrared spectra.

*Example 2*

A mixture of 4.27 moles of o-tolyisocyanate, 0.0415 mole of beryllium acetylacetonate and 8.9 moles of the solvent orthodichlorobenzene is placed in a reaction vessel as described in Example 1. The mixture is then heated at 180° C. for 6¾ hours with the evolution of carbon dioxide. Infrared absorption spectrum of the reaction product shows the formation of di-o-tolyl-carbodiimide.

*Example 3*

The procedure of Example 1 is repeated using 0.050 mole of chromic acetylacetonate as the catalyst. Infrared absorption spectrum of the reaction product again discloses the formation of di-o-tolyl-carbodiimide.

Example 4

Into the reaction vessel as described in Example 1 is placed 0.0014 mole of ferric acetylacetonate and 0.746 mole of o-tolylisocyanate. The vessel is then heated for 3 hours at 120° C. The di-o-tolylcarbodiimide formed is identified by the characteristic carbodiimide band at 4.72 microns upon infrared spectrum analysis.

As many widely different embodiments of this invention may be made without departing from the spirit and scope thereof, it is to be understood that this invention is not limited to the specific embodiments thereof except as defined in the appended claims.

What is claimed is:

1. A process for preparing organic carbodiimides which comprises heating in a range of from about 100° C. to 250° C. under anhydrous conditions an organic isocyanate containing 1 to 3 isocyanate groups and selected from the group consisting of carbocyclic aromatic isocyanates containing from one to three rings, saturated aliphatic isocyanates containing from two to eighteen carbons in the aliphatic group, pyridine isocyanates and quinoline isocyanates, said isocyanate being free of Zerewitinoff active hydrogen, and a catalyst comprising a nonionic acetylacetone derivative of a metal selected from the class consisting of group IIA, group IIIB, group IVB of atomic numbers 40 to 72, group VB, group VIB, group VIIB of atomic number 25, group VIII, group IB of atomic number 29, group IIIA of atomic numbers 13 to 81, the lanthanide series of atomic numbers 58 to 71 and the actinide series of atomic numbers 89, 90 and 92.

2. A process as defined in claim 1 wherein said catalyst is the beryllium derivative of acetylacetone.

3. A process as defined in claim 1 wherein said catalyst is the aluminum derivative of acetylacetone.

4. A process as defined in claim 1 wherein said catalyst is the zirconium derivative of acetylacetone.

5. A process as defined in claim 1 wherein said catalyst is the chromium derivative of acetylacetone.

6. A process as defined in claim 1 wherein said catalyst is the iron derivative of acetylacetone.

References Cited in the file of this patent

Bergmann: The Chemistry of Acetylene and Related Compounds, p. 80 (1948).

Dyer et al.: Journ. of Organic Chemistry, vol. 26, pages 4677 to 4678 (November 1961).